United States Patent
Ichikawa (10) Patent No.: US 7,475,951 B2
(45) Date of Patent: Jan. 13, 2009

(54) CONTROL SYSTEM FOR BRAKE VACUUM PUMP

(75) Inventor: Katsufumi Ichikawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 198 days.

(21) Appl. No.: 11/332,232

(22) Filed: Jan. 17, 2006

(65) Prior Publication Data
US 2006/0158028 A1    Jul. 20, 2006

(30) Foreign Application Priority Data
Jan. 18, 2005  (JP) .............. 2005-010888
Jan. 18, 2005  (JP) .............. 2005-010889

(51) Int. Cl.
B60T 13/46  (2006.01)
(52) U.S. Cl. ............... 303/12; 303/114.3; 188/356
(58) Field of Classification Search ........... 303/12, 303/114.3; 188/356, 357; 60/397, 411, 412
See application file for complete search history.

(56) References Cited

U.S. PATENT DOCUMENTS

| 2,705,870 | A | * | 4/1955 | Holton | 303/12 |
| 4,024,709 | A | * | 5/1977 | Erdmann | 60/397 |
| 4,328,669 | A | * | 5/1982 | Mort | 60/397 |
| 4,738,112 | A | | 4/1988 | Nomura et al. | 303/12 |
| 5,515,676 | A | | 5/1996 | Earle et al. | |
| 6,301,883 | B1 | * | 10/2001 | Fulks et al. | 60/397 |
| 6,324,845 | B1 | * | 12/2001 | Fulks et al. | 60/397 |

FOREIGN PATENT DOCUMENTS

| EP | 0 469 615 A1 | 2/1992 |
| EP | 0 553 010 A1 | 7/1993 |
| JP | 59 164252 | 9/1984 |
| JP | 09-177678 | 7/1997 |
| WO | WO 93/11983 | 6/1993 |
| WO | WO 2005/123476 A1 | 12/2005 |

OTHER PUBLICATIONS

European Search Report dated Oct. 23, 2006, corresponding to EP 06 00 0957.

* cited by examiner

Primary Examiner—Thomas J Williams
(74) Attorney, Agent, or Firm—Smith, Gambrell & Russell, LLP (57) ABSTRACT

A control system for a brake vacuum pump, the system being capable of accumulating a negative pressure required for a vacuum chamber, without excessively operating the vacuum pump. In this system, an EGI_ECU determines whether a vehicle has experienced running at a speed equal to or higher than a preset creep vehicle speed after the startup of an engine. The EGI_ECU prohibits the operation of the vacuum pump until the time when the vehicle experiences running at a speed equal to or higher than the creep vehicle speed. Thereby, in a situation obviously not requiring a strong braking force, such as in a stopped state immediately after the startup of the engine, the operation of the vacuum pump can be prohibited, which allows the vacuum pump to be accurately prevented from an unnecessary drive.

13 Claims, 4 Drawing Sheets

CONTROL SYSTEM FOR BRAKE VACUUM PUMP

CROSS REFERENCES TO RELATED APPLICATIONS

The present invention claims benefit of Japanese Patent Application No. 2005-10888 filed on Jan. 18, 2005 and No. 2005-10889 filed on Jan. 18, 2005, the contents of which are incorporated by this reference.

BACKGROUND OF THE INVENTION

1. Field of the Invention

The present invention relates to a control system for a brake vacuum pump, and more specifically, concerns a control system for the brake vacuum pump, the system performing the driving control of the vacuum pump that is connected to a vacuum chamber of a brake booster into which a negative pressure occurring in an intake manifold of an engine is introduced, and that assists the introduction of the negative pressure into the vacuum chamber.

2. Description of the Related Art

In a braking apparatus for a vehicle, the brake booster has been widely used for introducing the negative pressure occurring in the intake manifold of the engine into the vacuum chamber, and boosting a depression operating force against a brake pedal by making use of the negative pressure accumulated in the vacuum chamber.

In recent years, with a trend toward placing a throttle valve under electronic control for the purpose of improving exhaust emission characteristic, operating conditions in which a sufficient negative pressure is difficult to generate in the intake manifold, are on the increase. Furthermore, in recent times, for the purpose of enhancing the braking force in response to the upsizing of vehicle, there is a demand to keep the vacuum chamber in a deep negative pressure state (i.e., a low pressure state).

To cope with these situations, many techniques for assisting the introduction of negative pressure from the intake manifold to the vacuum chamber using the vacuum pump, have been proposed. For example, Japanese Unexamined Patent Application Publication No. 9-177678 discloses a technique for performing a driving control of the vacuum pump in response to the pressure state (absolute pressure or relative pressure) in the vacuum chamber (vacuum tank).

However, an arrangement that merely performs a driving control of the vacuum pump in response to a pressure state in the vacuum chamber as in the art disclosed in the above-described Japanese Unexamined Patent Application Publication No. 9-177678, may excessively operate the vacuum pump.

For example, when the negative pressure in the vacuum chamber temporarily becomes shallow (i.e., when the pressure becomes high) by a user performing repetitive braking operations in a short time, the vacuum pump may undesirably be operated even though the negative pressure can be quickly accumulated up to a predetermined value by using only the negative pressure occurring in the intake manifold.

Moreover, even in a situation not requiring so much braking force, such as before a starting state immediately after the startup of the engine, or in a constant running state at a relatively low speed, the vacuum pump may unfavorably be operated.

To overcome the above-described problems, the present invention is directed to a control system for the brake vacuum pump, the system being capable of accumulating the negative pressure required for the vacuum chamber, without excessively operating the vacuum pump.

SUMMARY OF THE INVENTION

The present invention provides a control system for a brake vacuum pump, the system performing the driving control of the vacuum pump that is connected to a vacuum chamber of a brake booster into which a negative pressure occurring in an intake manifold of an engine is introduced, and that assists the introduction of the negative pressure into the vacuum chamber. This system includes running experience determining means for determining whether a vehicle has experienced running at a speed equal to or higher than a preset creep vehicle speed after the startup of the engine; and prohibition means for prohibiting the operation of the vacuum pump at least until the time when the running experience determining means determines whether the vehicle has experienced running at a speed equal to or higher than the creep vehicle speed.

DESCRIPTION OF THE PREFERRED EMBODIMENTS

Figure 1:
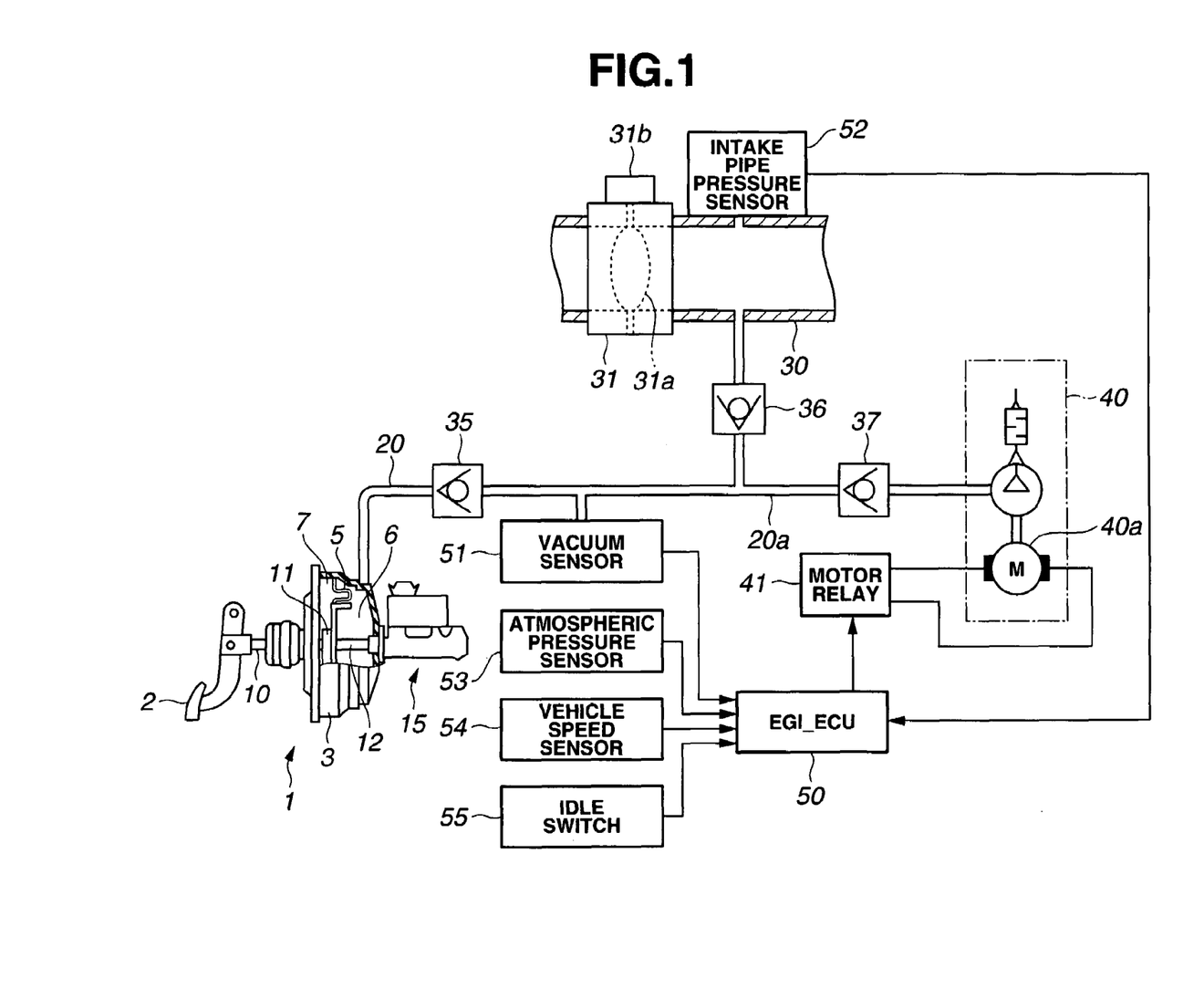
FIG. 1 is a schematic block diagram of a brake system according to an embodiment of the present invention.
Figure 2:
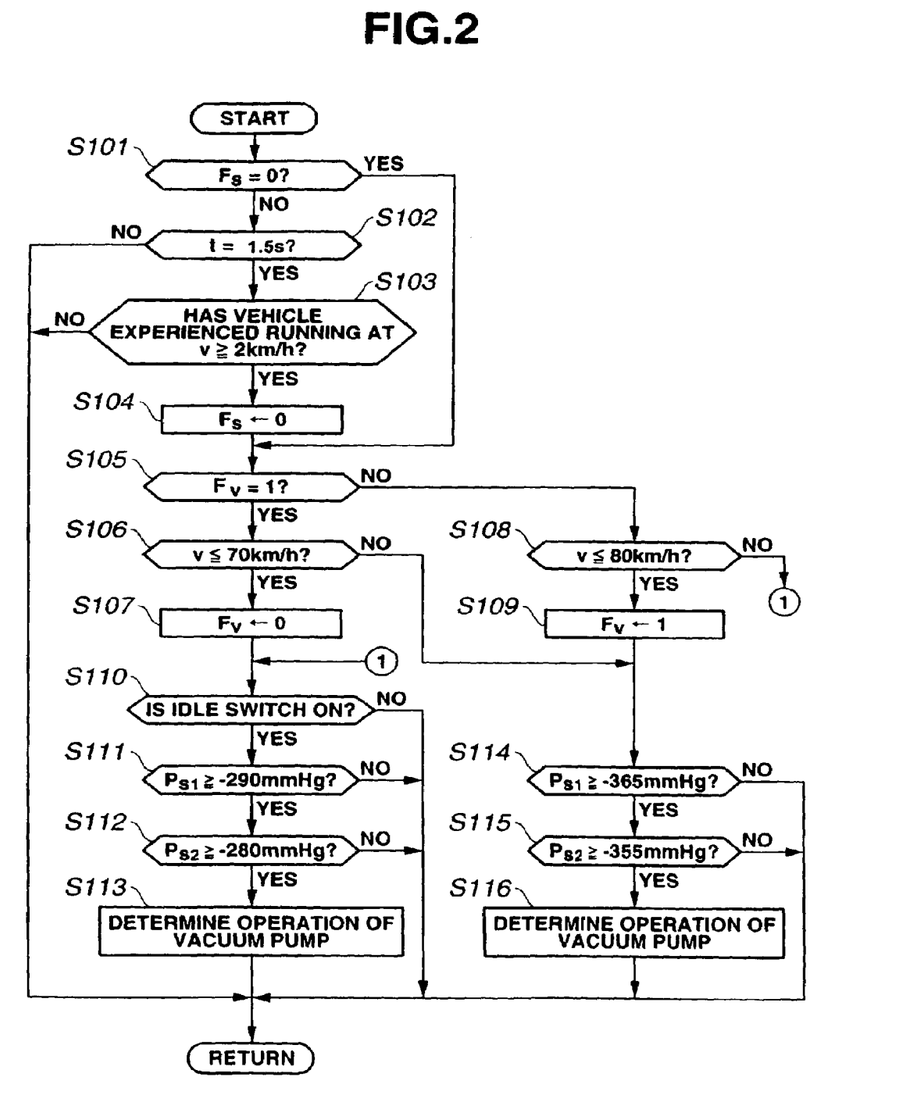
FIG. 2 is a flowchart showing an operation determination routine of a vacuum pump, according to the embodiment.
Figure 3:
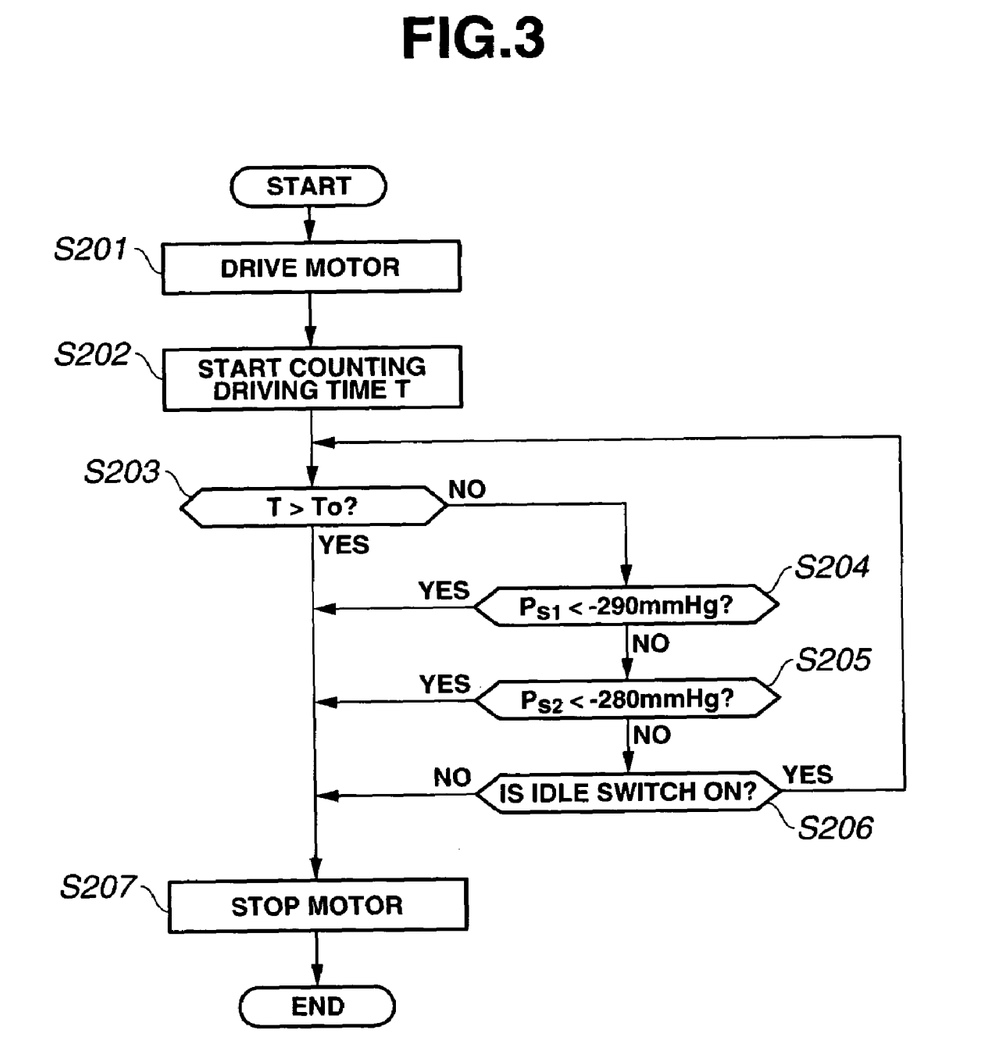
FIG. 3 is a flowchart showing a driving control routine of the vacuum pump during low-speed running, according to the embodiment.
Figure 4:
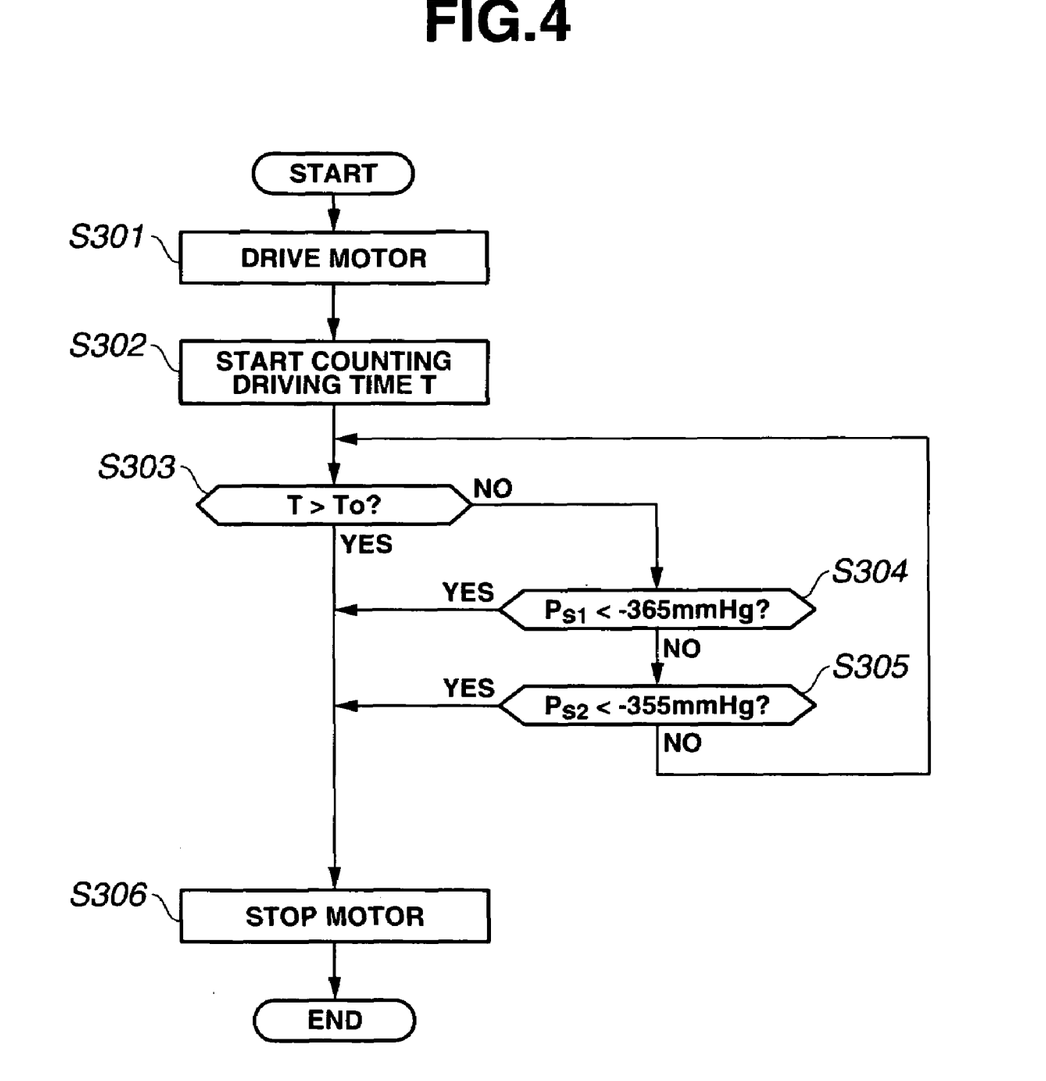
FIG. 4 is a flowchart showing a driving control routine of the vacuum pump during high-speed running, according to the embodiment.

Hereinafter, the embodiment according to the present invention will be described with reference to the accompanying drawings. These drawings pertain to present embodiment. FIG. 1 is a schematic block diagram of a brake system, FIG. 2 is a flowchart showing an operation determination routine of a vacuum pump, FIG. 3 is a flowchart showing a driving control routine of the vacuum pump during low-speed running, and FIG. 4 is a flowchart showing the driving-control routine of the vacuum pump during high-speed running.

Referring to FIG. 1, a negative-pressure type brake booster 1 is for boosting the pedal force applied to a brake pedal 2. The brake booster 1 comprises a shell 3 fixed to a toe board or the like; a diaphragm 5 partitioning the shell 3 into a vacuum chamber 6 and a controlled pressure chamber 7; a control valve mechanism 11 fixed to the diaphragm 5 and controlling the communication and interruption between the vacuum chamber 6 and controlled pressure chamber 7 according to a pressing operation of an input shaft 10 through the brake pedal 2; and an output shaft 12 that boosts the pressing operation force of the input shaft 10 by utilizing a differential pressure between the vacuum chamber 6 and controlled pressure chamber 7 and conveying the boosted force to a master cylinder 15.

The vacuum chamber 6 in the shell 3 is communicated with an intake manifold 30 of the engine through a vacuum conduit 20. Specifically, interposed in the intake manifold 30, is an electronically controlled throttle body 31 having a throttle valve 31a that is open/close driven by, e.g., a stepping motor 31b. The upstream end of the vacuum conduit 20, which end is located immediately downstream of the throttle body 31, communicates with the intake manifold 30. The negative pressure occurring in the intake manifold 30 is introduced into the vacuum chamber 6 through the vacuum conduit 20.

At immediately upstream of the vacuum chamber 6, and at immediately downstream of the intake manifold 30, respectively, check valves 35 and 36 for prohibiting a negative pressure introduced into the vacuum chamber 6 from flowing back toward the intake manifold 30 (i.e., prohibiting air flow from the intake manifold 30 to the vacuum chamber 6) are interposed on the way through the vacuum conduit 20. Meanwhile, in the embodiment, as viewed with reference to the flow of negative pressure, the upstream side of the vacuum conduit 20 refers to the intake manifold 30 side, while the downstream side thereof refers to the vacuum chamber 6 side.

Furthermore, the midway of the vacuum conduit 20 is branched between the check valves 35 and 36. A vacuum pump 40 is connected to a branch pipe 20a of the vacuum conduit 20, through a check valve 37 for prohibiting the flow of negative pressure from the vacuum chamber 6 side and the intake manifold 30 side. In the embodiment, the vacuum pump 40 is constituted of a motor-driven vacuum pump having a motor 40a incorporated therein. Once power from a battery (not shown) has been supplied to the motor 40a via motor relay 41 by energization control of a below-described engine control unit (EGI_ECU) 50, the vacuum pump 40 comes into operation and assists the introduction of the negative pressure from the intake manifold 30 to the vacuum chamber 6.

Connected to the EGI_ECU 50, are a vacuum sensor 51 for detecting the negative pressure (absolute pressure) in the vacuum chamber 6; an intake pipe pressure sensor 52 for detecting an intake pressure (absolute pressure) in the intake manifold 30 at a position immediately downstream of the throttle valve 31a; an atmospheric pressure sensor 53 for detecting the atmospheric pressure; a vehicle speed sensor 54 for detecting the vehicle speed v; and an idle switch 55 performing an ON operation when an accelerator pedal (not shown) is released. In the embodiment, the vacuum sensor 51 detects the negative pressure in the vacuum conduit 20, immediately upstream of the check valve 35, as a negative pressure in the vacuum chamber 6. Of course, the negative pressure in the vacuum chamber 6 may also be directly detected by the vacuum sensor 51.

The EGI_ECU 50 determines the differential pressure (intake pipe relative pressure) Ps1 between the negative pressure in the intake manifold 30 detected by the intake pipe pressure sensor 52 and the atmospheric pressure detected by the atmospheric pressure sensor 53, as well as it determines the differential pressure (booster relative pressure) Ps2 between the negative pressure in the vacuum chamber 6 detected by the vacuum sensor 51 and the atmospheric pressure detected by the atmospheric pressure sensor 53. Based on these results, the EGI_ECU 50 determines the permission or non-permission of the operation of the vacuum pump 40.

Specifically, the EGI_ECU 50 determines the operation (operation permission) of the vacuum pump 40 when the intake pipe relative pressure Ps1 is higher than a preset first threshold value Pt1 (namely, when the intake pipe relative pressure exhibits a negative pressure value more shallow than the preset first threshold value), and simultaneously the booster relative pressure Ps2 is higher than a preset second threshold value Pt2 (namely, when the booster relative pressure exhibits a negative pressure value more shallow than the preset second threshold value). Here, in this embodiment, the first threshold value Pt1 is set to a low value (i.e., a deep negative pressure value) relative to the second threshold value Pt2. Also, in the embodiment, the first and second threshold values Pt1 and Pt2 are each arranged to be variably switched in accordance with the vehicle speed v. For example, at a constant speed running in which the vehicle speed v is lower than a predetermined vehicle speed, the first threshold value Pt1 is set to Pt1=−290 mmHg, and the second threshold value Pt2 is set to Pt2=−280 mmHg. On the other hand, at a high-speed running in which the vehicle speed v is higher than a predetermined vehicle speed, the first threshold value Pt1 is set to Pt1=−365 mmHg, and the second threshold value Pt2 is set to Pt2=−355 mmHg.

Here, even when the EGI_ECU 50 is to determine the operation of the vacuum pump 40 based on the booster relative pressure and intake pipe relative pressure, if the running state of the vehicle, the operating state of the engine, and the like are in predetermined states, the EGI_ECU 50 prohibits the operation of the vacuum pump 40.

Specifically, for example, the EGI_ECU 50 determines, based on a vehicle speed detected by the vehicle speed sensor 54, whether the vehicle has experienced running (creep running) at a vehicle speed higher than a preset creep vehicle speed after the engine has started. When the EGI_ECU 50 determines that the vehicle has not yet experienced creep running (namely, until the time when the vehicle experiences the creep running), the EGI_ECU 50 prohibits the operation of the vacuum pump 40. Meanwhile, as described below, determination regarding whether an elapsed time after the startup of the engine is longer than a set time t (e.g., 1.5 sec) may be added to the above-described determination condition of the operation prohibition of the vacuum pump 40.

Also, even after the vehicle has experienced creep running, if an accelerator operation is underway when the vehicle is running at a speed equal to or lower than the set vehicle speed, the EGI_ECU 50 prohibits the operation of the vacuum pump 40. Here, in this embodiment, for example, when the idle switch 55 is OFF, the EGI_ECU 50 determines that the accelerator operation is underway.

As described above, the EGI_ECU 50 performs functions as the intake pipe relative pressure detecting means, booster relative pressure detecting means, running experience determination means, and prohibition means, together with the switches and sensors 51 to 55.

Next, the operation determination of the vacuum pump 40, executed by the EGI_ECU 50 will be described with reference to a flowchart of operation determination routine for the vacuum pump, as shown in FIG. 2. This routine is executed for each set time. Upon start of the routine, in step S101, the EGI_ECU 50 firstly checks whether a prohibition flag Fs for prohibiting the operation of the vacuum pump 40 is "0". This prohibition flag Fs is arranged to be set to "1" at an initial state immediately after the startup of the engine, and prohibits the operation of the vacuum pump 40 until the time when the conditions of steps S102 and S103 described below are satisfied and Fs=1 is changed over to Fs=0.

Specifically, in step S101, if the EGI_ECU 50 determines that the prohibition flag is Fs=1, the EGI_ECU 50 proceeds to step S102, and checks whether the elapsed time t after the startup of the engine is the set time (e.g., 1.5 sec) or more.

In step S102, if the EGI_ECU 50 determines that the elapsed time t is shorter than 1.5 sec, it exits the present routine without further processing. That is, the engine immediately after the startup is in unstable driven conditions, and hence, it is undesirable to operate the vacuum pump 40 under such unstable conditions to thereby load an alternator and battery. Therefore, when the elapsed time t after the startup of the engine is shorter than 1.5 sec, the EGI_ECU 50 exits the routine with the operation of the vacuum pump 40 prohibited.

On the other hand, in step S102, if the EGI_ECU 50 determines that the elapsed time t after the startup of the engine is in excess of the set time, the EGI_ECU 50 proceeds to step S103, and checks whether the vehicle has experienced running at a speed equal to or higher than a set creep vehicle speed (e.g., 2 km/h).

In step S103, if the EGI_ECU 50 determines that the vehicle has not yet experienced running at a speed equal to or higher than the set creep vehicle speed after the startup of the engine, it exits the routine without further processing. That is, at a time after the startup of the engine when the vehicle has not yet experienced running even at a very slow speed, the need for so much braking force would be unthinkable, and hence, the EGI_ECU 50 exits the routine with the prohibition flag Fs kept at "1", to avoid an unnecessary operation of the vacuum pump 40.

On the other hand, in step S103, if the EGI_ECU 50 determines that the vehicle has experienced running at a speed equal to or higher than the creep vehicle speed, the EGI_ECU 50 proceeds to step S104, and after having released the prohibition flag Fs (i.e., Fs←0), it proceeds to step S105.

Also, in step S101, if the EGI_ECU 50 determines that the prohibition flag is Fs=0, that is, the operation prohibition of the vacuum pump 40 has been released, it proceeds to step S105.

Upon proceeding from step S101 or step S104 to step S105, the EGI_ECU 50 checks whether a high-speed running determination flag Fv is "1". Here, the high-speed running determination flag Fv is arranged to be set to "1" when the vehicle is at predetermined high-speed running. Herein, in order to prevent the high-speed running determination flag Fv from being switched at frequent intervals, the EGI_ECU 50 switches the high-speed running determination flag Fv with a predetermined hysteresis provided, by the processes of the following steps S106 to S109.

Specifically, in step S105, upon determining that the high-speed running determination flag Fv is "1", the EGI_ECU 50 proceeds to step S106, and checks whether the current vehicle speed v is, e.g., equal to or lower than 70 km/h. In step S106, if the EGI_ECU 50 determines that the vehicle speed is equal to or lower than 70 km/h, it proceeds to step S107, and after having released the high-speed running determination flag Fv (i.e., Fv←0), it proceeds to step S110.

On the other hand, in step S106, upon determining that the vehicle speed is higher than 70 km/h, the EGI_ECU 50 proceeds to step S114 with the high-speed running determination flag Fv=1 maintained.

Also, in step S105, upon determining that the high-speed running determination flag Fv is "0", the EGI_ECU 50 proceeds to step S108, and checks whether the current vehicle speed v is, e.g., equal to or higher than 80 km/h. In step S108, upon determining that the vehicle speed is equal to or higher than 80 km/h, the EGI_ECU 50 proceeds to step S109, and after having set the high-speed running determination flag Fv to "1" (i.e., Fv←1), proceeds to step S114.

On the other hand, in step S108, upon determining that the vehicle speed is lower than 80 km/h, the EGI_ECU 50 proceeds to step S110 with the high-speed running determination flag Fv=0 maintained.

When the EGI_ECU 50 determines that the high-speed running determination flag is Fv=0 and that the vehicle is at least running at the vehicle speed lower than 80 km/h, and proceeds from step S107 or S108 to step S110, it checks whether an idle switch 55 is ON, that is, whether the accelerator operation by the driver is underway.

In step S110, upon determining that the idle switch 55 is OFF, that is, the accelerator operation by the driver is underway, the EGI_ECU 50 exits the routine without further processing. That is, when the idle switch 55 is OFF, it can be presumed that the driver has an intention to continue running at a predetermined low speed. In addition, when running is continued at a predetermined low speed, the braking force is not needed so much. Furthermore, during low-speed running, it would be unthinkable that the throttle valve 31*a* frequently fully opened, and a sufficient negative pressure can be easily generated in the intake manifold 30. Therefore, even if temporary brake operations are frequently performed in a city area or the like, it is possible to quickly introduce a negative pressure from the intake manifold 30 into the vacuum chamber 6. Hence, during low-speed running with the idle switch 55 being in an OFF-state, the EGI_ECU 50 exits the routine without further processing, to prohibit an unnecessary operation of the vacuum pump 40.

On the other hand, in step S110, upon determining that the idle switch 55 is ON, the EGI_ECU 50 proceeds to step S111, and checks whether the intake pipe relative pressure Ps1 is equal to or higher than the preset first threshold value (e.g., −290 mmHg).

Then, in step S111, upon determining that the intake pipe relative pressure Ps1 is lower than the preset first threshold value (−290 mmHg), that is, a sufficient negative pressure has occurred in the intake manifold 30, the EGI_ECU 50 exits the routine without further processing. That is, when a sufficient negative pressure has occurred in the intake manifold 30, even if the negative pressure in the vacuum chamber 6 should be shallow, it can be expected that a negative pressure is quickly introduced into the vacuum chamber 6. This is why EGI_ECU 50 exits the routine without further processing.

On the other hand, in step S111, when the EGI_ECU 50 determines that the intake pipe relative pressure Ps1 is equal to or higher than the first threshold value (−290 mmHg), and proceeds to step S112, it checks whether the booster relative pressure Ps2 is equal to or higher than the preset second threshold value (−280 mmHg).

In step S112, upon determining that the booster relative pressure Ps2 is lower than the second threshold value (−280 mmHg), that is, the negative pressure state in the vacuum chamber 6 is a state of having a negative pressure sufficient to produce a predetermined braking force, the EGI_ECU 50 exits the routine without further processing.

On the other hand, in step S112, upon determining that the booster relative pressure Ps2 is equal to or higher than the second threshold value (−280 mmHg), that is, the negative pressure state in the vacuum chamber 6 is not a state of having a negative pressure sufficient to produce the predetermined braking force, the EGI_ECU 50 proceeds to step S113, and after having determined the operation permission of the vacuum pump 40, exits the routine. That is, when the EGI_ECU 50 determines that, during low-speed running, at least the intake pipe relative pressure Ps1 is equal to or higher than the first threshold value (−290 mmHg), and simultaneously the booster relative pressure Ps2 is equal to or higher than the second threshold value (−280 mmHg), the EGI_ECU 50 permits the operation of the vacuum pump 40.

On the other hand, when the EGI_ECU 50 determines that the high-speed running determination flag is Fv=1 and that the vehicle is at least running at the vehicle speed higher than 70 km/h, and proceeds from step S106 or S109 to step S114, the EGI_ECU 50 checks whether the intake pipe relative pressure Ps1 is equal to or higher than the preset first threshold value (e.g., −365 mmHg).

In step S114, upon determining that the intake pipe relative pressure Ps1 is lower than the preset first threshold value (−365 mmHg), that is, a sufficient negative pressure has occurred in the intake manifold 30, the EGI_ECU 50 exits the routine without further processing. That is, when a sufficient negative pressure has occurred in the intake manifold 30, even in the event that the negative pressure in the vacuum chamber 6 is shallow, it can be expected that a negative pressure is quickly introduced into the vacuum chamber 6. This is why the EGI_ECU 50 exits the routine without further processing.

On the other hand, in step S114, when the EGI_ECU 50 determines that the intake pipe relative pressure Ps1 is equal to or higher than the first threshold value (−365 mmHg), and proceeds to step S115, it checks whether the booster relative pressure Ps2 is equal to or higher than the preset second threshold value (e.g., −355 mmHg).

In step S115, upon determining that the booster relative pressure Ps2 is lower than the second threshold value (−355 mmHg), that is, the negative pressure state in the vacuum chamber 6 is a state of having a negative pressure enough to produce the predetermined braking force, the EGI_ECU 50 exits the routine without further processing.

On the other hand, in step S115, upon determining that the booster relative pressure Ps2 is equal to or higher than the second threshold value (−355 mmHg), that is, the negative pressure state in the vacuum chamber 6 is not a state of having a negative pressure enough to produce the predetermined braking force, the EGI_ECU 50 proceeds to step S116, and after having determined the operation of the vacuum pump 40, exits the routine. That is, when the EGI_ECU 50 determines that, during high-speed running, at least the intake pipe relative pressure Ps1 is equal to or higher than the first threshold value (−365 mmHg), and simultaneously the booster relative pressure Ps2 is equal to or higher than the second threshold value (−355 mmHg), the EGI_ECU 50 permits the operation of the vacuum pump 40.

Next, the driving control of the vacuum pump 40, executed by the EGI_ECU 50 during low-speed running will be described with reference to a flowchart of driving control routine for the vacuum pump, as shown in FIG. 3. In the above-described operation determination routine for the vacuum pump 40, this routine is an interrupt routine starting when the operation of the vacuum pump 40 is determined in step S113. Upon start of the routine, firstly in step S201, the EGI_ECU 50 starts power feeding to a motor 40a through a motor relay 41 to drive the vacuum pump 40. Then, in step S202, the EGI_ECU 50 starts counting a driving time T by a timer.

Next, in step S203, the EGI_ECU 50 checks whether the driving time T for the vacuum pump 40 is longer than a preset stop determination time T0 (e.g., T0=245 sec). In step S203, if the EGI_ECU 50 determines that the driving time T is longer than the stop determination time T0, it proceeds to step S207.

On the other hand, in step S203, if the EGI_ECU 50 determines that the driving time T is equal to or shorter than the preset stop determination time T0, it proceeds to step S204, and checks whether the intake pipe relative pressure Ps1 has become lower than the first threshold value (−290 mmHg). In step S204, if the EGI_ECU 50 determines that the intake pipe relative pressure Ps1 has become lower than the first threshold value (−290 mmHg), it proceeds to step S207. On the other hand, if the EGI_ECU 50 determines that the intake pipe relative pressure Ps1 is still equal to or higher than the first threshold value (−290 mmHg), it proceeds to step S205.

Upon proceeding from step S204 to step S205, the EGI_ECU 50 checks whether the booster relative pressure Ps2 has become lower than the second threshold value (−280 mmHg). In step S205, if the EGI_ECU 50 determines that the booster relative pressure Ps2 has become lower than the second threshold value (−280 mmHg), it proceeds to step S207. On the other hand, if the EGI_ECU 50 determines that the booster relative pressure Ps2 is still not lower than the second threshold value (−280 mmHg), it proceeds to step S206.

Upon proceeding from step S205 to step S206, the EGI_ECU 50 checks whether the ON state of the idle switch 55 is continuing. If the EGI_ECU 50 determines that the idle switch 55 is still in a ON state, the EGI_ECU 50 returns to step S203 to continue driving the vacuum pump 40. On the other hand, if the EGI_ECU 50 determines that the idle switch 55 has been turned OFF, it proceeds to step S207.

Then, upon proceeding from step S203, S204, S205, or S206 to step S107, the EGI_ECU 50 finishes the power feeding to the motor 40a through the motor relay 41, and after having stopped the vacuum pump 40, exits the routine.

Next, the driving control of the vacuum pump 40, executed by the EGI_ECU 50 during high-speed running will be described with reference to a flowchart of driving control routine for the vacuum pump 40, as shown in FIG. 4. In the above-described operation determination routine for the vacuum pump 40, this routine is an interrupt routine starting when the operation of the vacuum pump 40 is determined in step S116. Upon start of the routine, firstly in step S301, the EGI_ECU 50 starts power feeding to a motor 40a through a motor relay 41 to drive the vacuum pump 40. Then, in step S302, the EGI_ECU 50 starts counting the driving time T by the timer.

Next, in step S303, the EGI_ECU 50 checks whether the driving time T for the vacuum pump 40 is longer than the preset stop determination time T0 (e.g., T0=245 sec). In step S303, if the EGI_ECU 50 determines that the driving time T is longer than the stop determination time T0, it proceeds to step S306.

On the other hand, in step S303, if the EGI_ECU 50 determines that the driving time T is equal to or shorter than the stop determination time T0, it proceeds to step S304, and checks whether the intake pipe relative pressure Ps1 has become lower than the first threshold value (−365 mmHg). In step S304, if the EGI_ECU 50 determines that the intake pipe relative pressure Ps1 has become lower than the first threshold value (−365 mmHg), it proceeds to step S306. On the other hand, if the EGI_ECU 50 determines that the intake pipe relative pressure Ps1 is still equal to or higher than the first threshold value (−365 mmHg), it proceeds to step S305.

Upon proceeding from step S304 to step S305, the EGI_ECU 50 checks whether the booster relative pressure Ps2 has become lower than the second threshold value (−355 mmHg). In step S305, if the EGI_ECU 50 determines that the booster relative pressure Ps2 has become lower than the second threshold value (−355 mmHg), it proceeds to step S306. On the other hand, if the EGI_ECU 50 determines that the booster relative pressure Ps2 is still equal to or higher than the second threshold value (−355 mmHg), it returns to step S303.

Upon proceeding from step S303, S304, or S305 to step S306, the EGI_ECU 50 finishes power feeding to the motor 40a through the motor relay 41, and after having stopped the vacuum pump 40, exits the routine.

According to such an embodiment, by performing the operation determination of the vacuum pump 40 based on the booster relative pressure Ps2, which is the differential pressure between the negative pressure in the vacuum chamber 6 and the atmospheric pressure, it is possible to exert intended brake performance by virtue of a negative pressure accumulated in the vacuum chamber 6, even if the atmospheric pressure varies. Furthermore, by using not only the booster relative pressure Ps2 but also the intake pipe relative pressure Ps1, which is the relative pressure between the negative pressure in the intake manifold 30 and the atmospheric pressure, unnecessary driving of the vacuum pump 40 can be prevented. That is, even when the booster relative pressure Ps2 in the vacuum chamber 6 becomes a shallow negative value, if the intake pipe relative pressure Ps1 is a deep negative value, it is possible to accurately prevent unnecessary driving of the vacuum pump 40 by foreclosing the vacuum pump 40 from operating.

Moreover, when performing the operation determination of the vacuum pump 40 using the intake pipe relative pressure Ps1 and booster relative pressure Ps2, by setting the first threshold value, which is a determination threshold value with respect to the intake pipe relative pressure Ps1, to a low value (i.e., a deep negative value) relative to the second threshold value, which is a determination threshold value with respect to the booster relative pressure Ps2, it is possible to achieve a high-precision operation determination with respect to the vacuum pump 40, allowing for pressure losses in the vacuum conduit 20 (hose, check valves, etc.).

Also, by prohibiting the operation of the vacuum pump 40 until the time when the vehicle experiences running at a speed equal to or higher than the preset creep vehicle speed after the startup of the engine, it is possible to effectively prevent the vacuum pump 40 from being unnecessarily driven. That is, in a situation obviously not requiring a strong braking force, such as in a stopped state immediately after the startup of the engine, the prohibition of the operation of the vacuum pump 40 enables the accurate prevention of unnecessary drive of the vacuum pump 40.

Furthermore, during running at a speed lower than the predetermined speed, when the accelerator operation by the driver is underway (i.e., when the idle switch 55 is OFF), the prohibition of operation of the vacuum pump 40 allows the accurate prevention of unnecessary drive of the vacuum pump 40.

By preventing unnecessary drive of the vacuum pump 40, the improvement in exhaust emission characteristic of the engine and the enhancement of fuel economy can be realized, as well as the promotion of durability of the vacuum pump 40 can be implemented.

Having described the preferred embodiment of the invention referring to the accompanying drawings, it should be understood that the present invention is not limited to this precise embodiment and various changes and modifications thereof could be made by one skilled in the art without departing from the spirit or scope of the invention as defined in the appended claims.

What is claimed is:

1. A control system for a brake vacuum pump, the system performing the driving control of the vacuum pump that is connected to a vacuum chamber of a brake booster into which a negative pressure occurring in an intake manifold of an engine is introduced, and that assists the introduction of the negative pressure into the vacuum chamber, the system comprising:
    intake pipe relative pressure detecting means for determining an intake pipe relative pressure, which is a differential pressure between the intake pipe negative pressure in the intake manifold and the atmospheric pressure;
    booster relative pressure detecting means for determining a booster relative pressure, which is a differential pressure between the negative pressure in the vacuum chamber and the atmospheric pressure; and
    pump operation determining means for operating the vacuum pump when the intake pipe relative pressure is higher than a preset first threshold value and simultaneously the booster relative pressure is higher than a preset second threshold value, and
        wherein the first threshold value is set to a low value relative to the second threshold value.

2. The control system for the brake vacuum pump according to claim 1, further comprising:
    running experience determining means for determining whether a vehicle has experienced running at a speed equal to or higher than a preset creep vehicle speed after the startup of the engine; and
    prohibition means for prohibiting the operation of the vacuum pump at least until the time when the running experience determining means determines whether the vehicle has experienced running at a speed equal to or higher than the creep vehicle speed.

3. The control system for the brake vacuum pump according to claim 2, wherein the prohibition means prohibits the operation of the vacuum pump when the vehicle speed is lower than a set vehicle speed and simultaneously an accelerator operation is underway.

4. The control system for the brake vacuum pump according to claim 1, wherein the first threshold value when a vehicle runs at low speed is set at a higher value than when the vehicle runs at high speed.

5. The control system for the brake vacuum pump according to claim 1, wherein the second threshold value when a vehicle runs at low speed is set at a higher value than when the vehicle runs at high speed.

6. The control system for the brake vacuum pump according to claim 1, further comprising:
    prohibition means for prohibiting the operation of the vacuum pump when an accelerator operation is underway.

7. A control system for a brake vacuum pump, the system performing the driving control of the vacuum pump that is connected to a vacuum chamber of a brake booster into which a negative pressure occurring in an intake manifold of an engine is introduced, and that assists the introduction of the negative pressure into the vacuum chamber, the system comprising:
    running experience determining means for determining whether a vehicle has experienced running at a speed equal to or higher than a preset creep vehicle speed after the startup of the engine; and
    prohibition means for prohibiting the operation of the vacuum pump at least until the time when the running experience determining means determines whether the vehicle has experienced running at a speed equal to or higher than the creep vehicle speed.

8. The control system for the brake vacuum pump according to claim 7, wherein the prohibition means prohibits the operation of the vacuum pump when the vehicle speed is lower than a set vehicle speed and simultaneously an accelerator operation is underway.

9. The control system for the brake vacuum pump according to claim 7, wherein the prohibition means also prohibits the operation of the vacuum pump when an accelerator operation is underway.

10. The control system for the brake vacuum pump according to claim 7, wherein the prohibition means also prohibits the operation of the vacuum pump any time the running experience determining means determines that the vehicle is experiencing a running speed less than the creep vehicle speed after the startup of the engine.

11. The control system for the brake vacuum pump according to claim 7, further comprising:
    intake pipe relative pressure detecting means for determining an intake pipe relative pressure, which is a differential pressure between the intake pipe negative pressure in the intake manifold and the atmospheric pressure;

booster relative pressure detecting means for determining a booster relative pressure, which is a differential pressure between the negative pressure in the vacuum chamber and the atmospheric pressure; and pump operation determining means for operating the vacuum pump when the intake pipe relative pressure is higher than a preset first threshold value and simultaneously the booster relative pressure is higher than a preset second threshold value, and wherein the first threshold value is set to a low value relative to the second threshold value.

12. The control system for the brake vacuum pump according to claim 11, wherein the first threshold value when a vehicle runs at low speed is set at a higher value than when the vehicle runs at high speed.

13. The control system for the brake vacuum pump according to claim 11, wherein the second threshold value when a vehicle runs at low speed is set at a higher value than when the vehicle runs at high speed.

* * * * *